Aug. 13, 1957  J. L. MONTGOMERY  2,802,396
FRANGIBLE JACKETS FOR MISSILES, AND THE LIKE
Filed Oct. 16, 1952  3 Sheets-Sheet 1
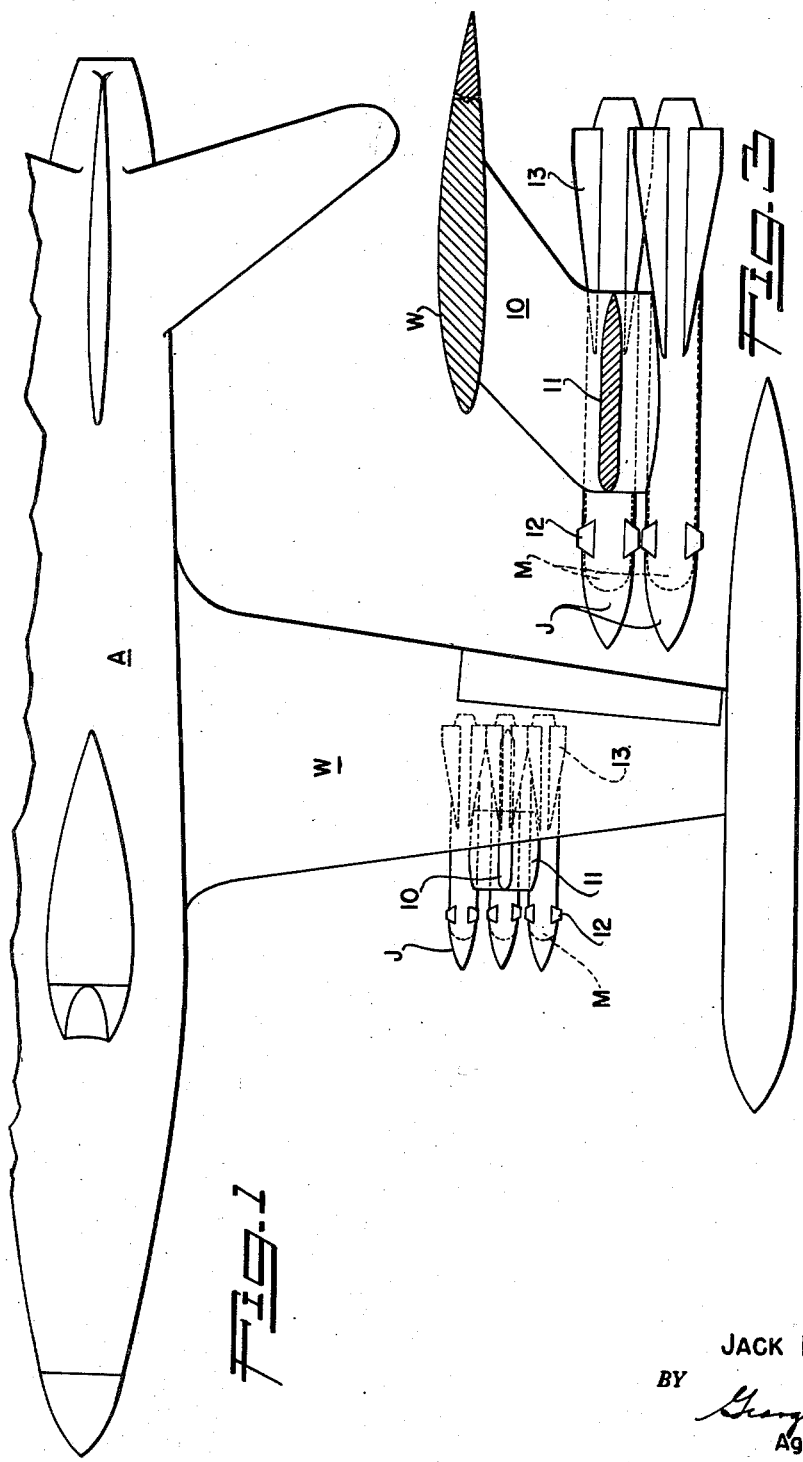
INVENTOR.
JACK L. MONTGOMERY
BY
Agent

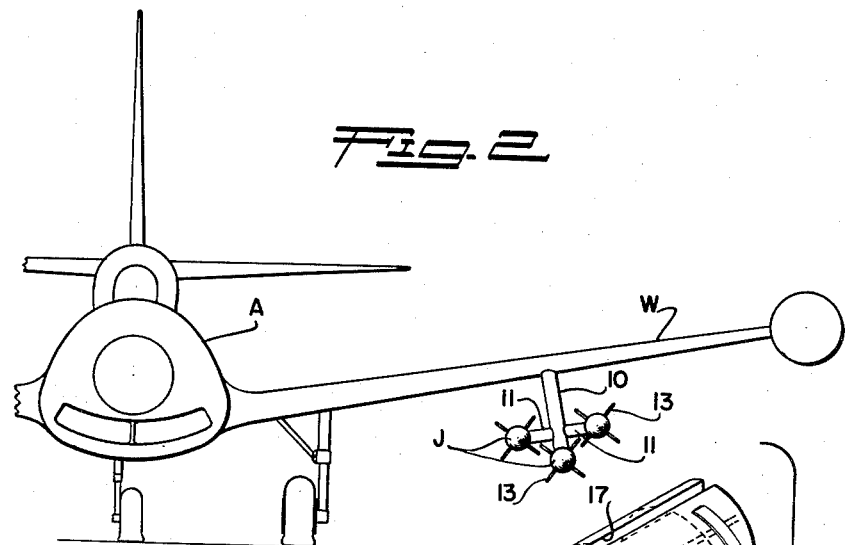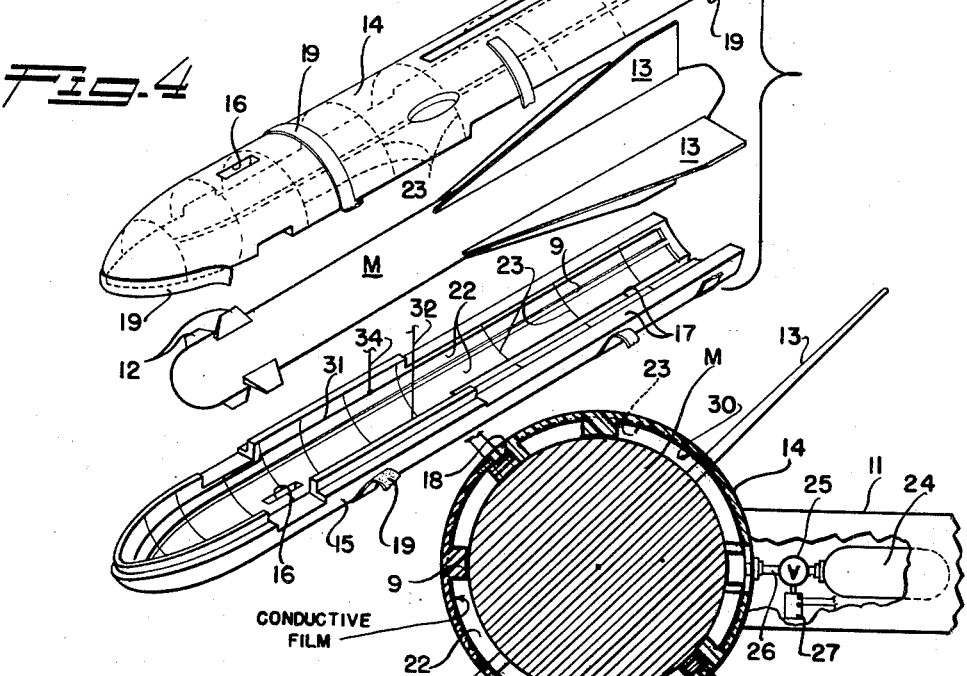

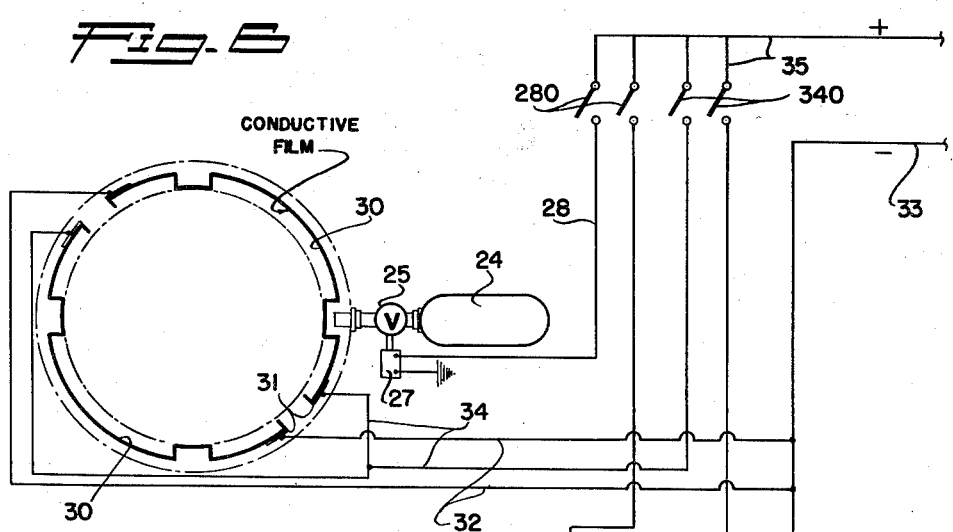
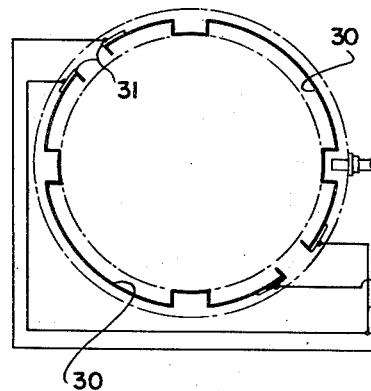
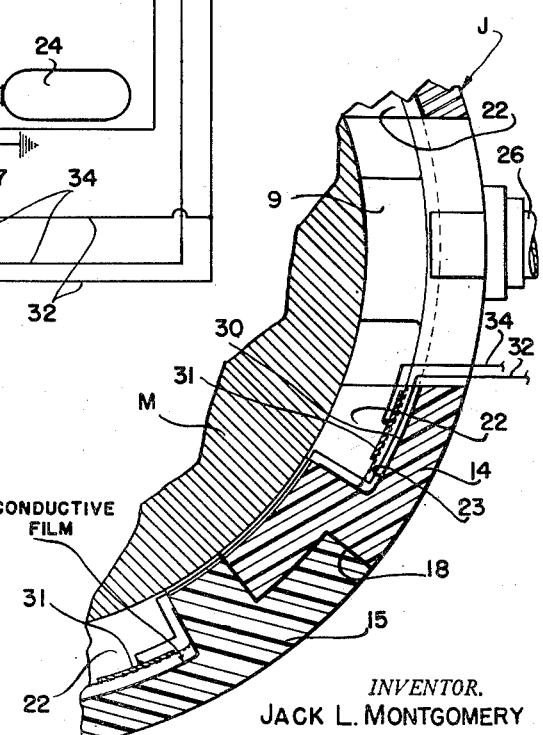
INVENTOR.
JACK L. MONTGOMERY
BY
George C. Sullivan
Agent

United States Patent Office 2,802,396
Patented Aug. 13, 1957

2,802,396

FRANGIBLE JACKETS FOR MISSILES AND THE LIKE

Jack L. Montgomery, Pacoima, Calif., assignor to Lockheed Aircraft Corporation, Burbank, Calif.

Application October 16, 1952, Serial No. 315,095

10 Claims. (Cl. 89—1.5)

This invention relates to the protection of aircraft armament and relates more particularly to protective coverings or jackets for missiles, rockets, and other devices and objects carried by aircraft and other vehicles.

It is an object of the invention to provide simple, practical and dependable frangible coverings or jackets for missiles, rockets, and other stores and devices, carried by aircraft and other high-speed vehicles. In military aircraft, rockets, guided missiles, and the like, have been stored in wing tip pods for launching or firing and the pods have provided the necessary protection against the elements and, in some instances, have included heating means for maintaining the contained missiles at the required temperatures. In certain aircraft and for structural and/or aerodynamic reasons, it may be desirable or necessary to carry the missiles on pylons, or the like, where they are in the open. The present invention provides effective, dependable jackets for protecting the missiles against the elements in such installations.

Another object of the invention is to provide protective jackets of this character that afford adequate protection for the missiles or other stores and objects and yet are frangible at will to permit the free, unobstructed launching or firing of the missiles, rockets, or the like. The jackets are constructed in such a manner that they may be quickly broken and disintegrated to expose the enclosed objects for use or launching.

Another object of the invention is to provide a simple yet effective and dependable means for selectively breaking or disintegrating the frangible jackets. This means is such that the frangible jacket of a selected rocket or missile may be entirely broken or shattered into small fragments that fall or blow free to entirely expose the missile or rocket, the pieces or fragments being small and light in weight so that they will not damage the control surfaces or other parts of the aircraft in flight.

Another and important object of this invention is to provide frangible protective jackets of this kind having novel, fully frangible heating means for maintaining the protected missile or object at the required or selected temperature. The heating means incorporated in the jackets of the invention do not include or necessitate wires or other metal parts that might interfere with the free release or launching of the missile, rocket, or the like.

A further object of the invention is to provide heated frangible protective jackets of the character described that are inexpensive and that are easily and quickly installed.

Other objectives and features of the invention will become apparent from the following detailed description of a typical preferred form and application of the invention illustrated in the accompanying drawings, wherein:

Figure 1 is a fragmentary plan view of an airplane equipped with missiles protected by the jackets of the invention;

Figure 2 is a fragmentary front view of the airplane;

Figure 3 is an enlarged substantially vertical sectional view through a wing of the airplane, illustrating the pylon, extending therefrom and two of the protected missiles carried by the pylon;

Figure 4 is an enlarged perspective view of one of the missiles showing the two halves or sections of the protective jacket in positions to be assembled thereon;

Figure 5 is an enlarged transverse sectional view of a jacket assembled on a missile illustrating a portion of the pylon and the gas pressure container therein;

Figure 6 is a diagrammatic view illustrating the electrical circuits associated with the jackets; and Figure 7 is an enlarged fragmentary sectional view of a jacket on a missile illustrating the manner of associating the electrical conductors with the conductive heating layers of the jacket.

The protective jackets of the invention may of course be employed to protect missiles, rockets and other stores and objects of different kinds and may be used in connection with aircraft and other vehicles carrying the same. In the drawings I have shown the jackets on missiles M releasably carried on pylons 10 extending from the under sides of the wings W of the airplane A. It is to be understood that this is merely an illustrative application and the invention is not intended to be restricted for use with the particular types of missiles and airplane illustrated. The pylons 10 which extend downwardly and forwardly from the undersides of the wings W at points between the wing tip and wing roots have pluralities of branches or arms 11 adjacent to their lower ends. The stores or missiles M are elongate generally cylindrical objects having rounded forward ends and provided with forward and aft sets of radially projecting vanes 12 and 13 respectively. In the particular installation illustrated there are three similar or like missiles M carried by each pylon 10 and it will be assumed that the missiles are to be launched or fired individually, it being apparent that they may be fired in salvos if desired. The missiles M are secured to the ends of the pylon arms 11 to extend fore and aft or chordwise of the wings W being detachably held by releasable shackles, shear pins and launching tracks or the like, not shown, as is the well known practice in such installations.

The invention provides frangible and heated protective jackets for the missiles M. In practice there will usually be a jacket J for each missile M and as the jackets may be substantially identical, I will proceed with a description of one of them, it being understood that such description is equally applicable to the others.

The protective jacket J is preferably sectional to facilitate the assembling of the same on the missile M. In most cases it will be most practical to construct the jacket J in two like or complementary halves or sections 14 and 15. The sections 14 and 15 are elongate parts of semi-cylindrical transverse cross section throughout the major portions of their lengths and are proportioned to rather closely conform to and fit about the missile M. The forward ends of the sections 14 and 15 are pointed and streamlined so that the assembly of the two sections forms a streamlined shell or fairing for the missile to reduce the aerodynamic drag. In this connection it will be observed that the pointed streamlined forward end of the jacket J extends forwardly beyond the blunt end of the missile. The jacket sections 14 and 15 have forward openings or slots 16 in their walls for receiving the forward vanes 12 and aft elongate slots 17 for passing or receiving the rear vanes 13. The slots 16 and 17 extend longitudinally of the jacket J and are shaped and proportioned to conform with their respective vanes 12 and 13. Certain of the slots 16 and 17 may be located at the joined or butting longitudinal edges of the sections 14 and 15 in which case portions of these slots are formed in the edges of the two sections.

The longitudinal edges of the sections 14 and 15 are preferably constructed to mate or interlock in such a way as to assure the proper relationship of the assembled sections and to assist in retaining them assembled on the missile M. In the arrangement illustrated, these edges are stepped to have lapped joints 18 and it will usually be preferred to provide cement in the joints 18 to secure the sections 14 and 15 one to the other. If desired in addition to this cement or in place thereof strips 19 of adhesive tape may be provided along the joints 18 and or wrapped around the jackets J. For the reasons which will later become apparent, the tape 19 is readily tearable for example it may be treated paper tape.

In accordance with the invention the jacket J is frangible, that is, it is constructed to be intentionally broken or disintegrated into relatively small fragments. The jacket sections 14 and 15 are constructed of frangible material such as glass, ceramic or a plastic that can be deliberately or intentionally broken and shattered. The sections 14 and 15 may be formed of frangible cellular phenolic resin plastic or a polyester resin having impregnated therein fiber glass fibers or felt. It is preferred to employ a plastic that presents a tough external surface to withstand rain impact etc. and that is light in weight and easily broken. The jacket J is preferably made relatively thin to facilitate its disintegration and in practice the walls of the jacket sections 14 and 15 may be only a fraction of an inch thick for example 1/8 of an inch thick. In the drawings the thickness of the jacket walls has been exaggerated for the purpose of clarity only.

The invention provides effective dependable means for breaking the frangible jacket J into relatively small pieces or fragments that will not damage or injure the control surfaces or other parts of the aircraft even during high speed flight. This means includes a plurality of longitudinally extending ducts 22 in the internal surfaces of the jacket sections 14 and 15. The ducts 22 preferably extend from adjacent the rear ends of the sections 14 and 15 to their pointed forward end portions. It will usually be preferred to make the ducts 22 quite wide and the areas between the ducts form ridges or bridges 9 which contact the missile. In practice the ducts 22 may be readily molded in the sections 14 and 15 when the same are cast or manufactured. In addition to the ducts 22 the internal surfaces of the jacket sections 14 and 15 have transverse scores or grooves 23. The grooves 23 preferably join or intersect the ducts 22 and may be either diagonally, crisscrossed or simply circumferential as illustrated. The grooves 23 may be shallower than the ducts 22. The ducts 22 are designed to receive a fluid under super atmospheric pressure to break the jacket J and the grooves 23 form lines of fracture to assure the breaking of the jacket into relatively small fragments and may assist in distributing the fracturing fluid pressure. While it is contemplated that the fluid under pressure may come from any selected source I have shown a bottle or container 24 of gas under pressure housed in the related pylon arm 11 and provided with a control discharge valve 25. The container 24 may contain carbon dioxide or other suitable gas under substantial pressure. A line or nipple 26 extends from a valve 25 to a duct 22 of the jacket J so that the gas under pressure is directed to the duct system of the jacket to exert a bursting force for breaking the jacket into small fragments. The valve 25 is adapted to be operated or opened by a solenoid 27. An energizing line or lead 28 extends from the solenoid 27 to a switch 280 in the cabin or the cockpit of the airplane A, the other side of the solenoid being grounded to the airplane structure. The valves 25 for the other jackets J may be controlled by similar switches 280. It will be seen that when it is desired to launch a given missile M its related switch 280 is closed to energize the solenoid 27 and open the valve 25. The gas under pressure thus released from the container 24 enters the ducts 22 where it exerts a force to break the frangible jacket. The ducts 22 and grooves 23 assure the breaking of the jacket into small and relatively small light weight fragments which are carried away by the slip stream to fully expose the missile M for launching.

The missiles M often have delicate and temperature sensitive parts and components and it is important to prevent the temperature of the missiles from falling below a given value. The jackets J of the invention have electrical heating means for maintaining the missiles M above the minimum desirable temperature. It is a feature of the invention that this means does not in any way interfere with the breaking and disintegrating of the jackets J by the compressed gas as above described. The heating means includes a film 30 of conductive material on the internal surface of each jacket J to constitute a resistance heating element. In the preferred arrangement films 30 of the conductive material cover substantially the entire surfaces of each pair of jacket sections 14 and 15. The films may be of the type known in the industry as "Electro Films" comprising a carrier of a suitable plastic or lacquer containing divided electrical conductive material such as divided metal. For most applications an electrical conductive film 30 utilizing one watt per square inch will provide sufficient heat for maintaining the contained missile M at the desired temperature level. The films 30 preferably have coatings of a non-conductive lacquer to prevent electrical contact with the missile. Suitable circuits are provided for energizing the heating films 30. In the particular case illustrated buses or strips 31 of foil, conductive tape or like frangible conductors extend along each longitudinal margin of each section 14 and 15 at its internal surface to be in electrical contact with the films 30. Leads 32 extend from one bus strip 31 of each section 14 and 15 to a common power line 33 and leads 34 extend from the other bus strips 31 to switches 340 which in turn are connected with the other power line 35. With this arrangement disintegration of one jacket J preparatory to launching its missile M does not interrupt or interfere with the electrical circuits to the heating films 30 of the other jackets. Furthermore the heating films 30 of the individual jackets J may be energized and deenergized at will.

From the foregoing detailed description it will be seen that I have provided simple dependable and effective protective jackets for rockets, missiles and other armament stores. The jackets J not only protect the stores against the elements but also serve to heat them to maintain the proper temperatures and streamline the assemblies to minimize drag. The jackets J of the selected individual missiles M may be readily broken and disintegrated by merely closing the respective switches 280 to energize the solenoids 27 to open the related valves 25 which admits the gas under pressure to the ducts 22, which gas pressure breaks the frangible jackets into small pieces and fragments. The electrical heating means does not in any way interfere with the free breaking and disintegration of the jackets and the fragments are blown away in the slip stream. This exposes the missile M and leaves it entirely free to be fired or launched. The conductive heating films 30 being continuous and extensive uniformly heat the missiles M throughout the critical areas thereof and where the films are in the nature of thin light weight layers on the surfaces themselves of the jackets they do not add materially to the weight of the jackets. The protective heating jackets are inexpensive to manufacture, easy to install and light in weight.

Having described only a typical form of the invention I do not wish to be limited to the specific details herein set forth, but wish to reserve to myself any variations or modifications that may appear to those skilled in the art and/or fall within the scope of the following claims.

I claim:

1. A device for protecting an airborne armament store otherwise exposed to the elements comprising a shell of frangible material snugly fitting about the store, the shell having a plurality of grooves in its internal surface forming lines of ready fracture and constituting gas ducts, and means for introducing gas under pressure into the ducts to break the frangible shell away from the store.

2. A device for protecting an airborne armament store otherwise exposed to the elements comprising a shell of frangible material fitting about the store, the shell having a plurality of grooves in its internal surface forming lines of ready fracture and constituting gas ducts, and means for introducing gas under pressure into the ducts to break the frangible shell away from the store, the internal surface of the shell having score grooves joining the first mentioned grooves and forming additional lines of fracture so that the shell breaks into relatively small pieces.

3. A device for protecting and streamlining an object of armament otherwise exposed to the elements comprising a jacket fitting about the object, the jacket including sections of readily frangible plastic having internal surface grooves constituting fluid ducts and providing lines of ready fracture, means for securing the sections together around the object, and means for conducting fluid under pressure to said grooves to break the sections and free them from the object.

4. A device for protecting and streamlining an object of armament otherwise exposed to the elements comprising a jacket fitting about the object, the jacket including sections of frangible plastic having internal surface grooves constituting fluid ducts and providing lines of ready fracture, the sections conforming to the object and together forming a streamlined covering for the object, means for securing the sections together around the object, and means for conducting fluid under pressure to said grooves to break the sections and free them from the object.

5. A device for protecting an object of armament otherwise exposed to the elements comprising a jacket for the object including thin walled frangible jacket sections fitting about the object, means for securing the sections together, conductive films on the inner surfaces of the sections, means for passing electricity through the films to maintain the temperature of the object above a given minimum, and remotely controlled fluid pressure means for breaking the frangible sections to free the jacket from the object.

6. A device for protecting an object of armament otherwise exposed to the elements comprising a jacket for the object including thin walled frangible jacket sections fitting about the object, means for securing the sections together, conductive films on the inner surfaces of the sections, means for passing electricity through the films to prevent excessive cooling of the object, and remotely controlled means for breaking the frangible sections to free the jacket from the object.

7. Means for protecting a missile when carried by an aircraft comprising a thin walled frangible plastic jacket fitting about the missile, a conductive coating on the internal surface of the jacket, means for passing electricity through the film to prevent excessive cooling of the missile, and remotely controlled means for breaking the frangible jacket to free the same from the missile.

8. Means for protecting a missile when carried by an aircraft comprising a thin walled frangible plastic jacket fitting about the missile, a conductive coating on the internal surface of the jacket, means for passing electricity through the film to prevent excessive cooling of the missile, and means for introducing fluid pressure into the jacket to break it and free it from the missile.

9. Means for protecting a missile when carried by an aircraft comprising a thin walled frangible plastic jacket fitting about the missile, a conductive coating on the internal surface of the jacket, means for passing electricity through the film to heat the missile, the internal surface of the jacket having grooves, and means for conducting fluid under pressure to the grooves to break the jacket and free it from the missile.

10. In combination with an airplane having a projecting pylon and a missile detachably carried thereby; a protective jacket for the missile comprising sections of frangible material assembled around the missile, the sections having fluid ducts constituting weakened lines of ready fracture, and means for breaking the jacket to free it from the missile including a source of fluid under pressure in the pylon, conduit means extending from said source to the ducts, valve means for the conduit means, and means in the airplane operable to open the valve means so that the fluid under pressure discharges into the ducts to break said sections into a multitude of fragments.

References Cited in the file of this patent

UNITED STATES PATENTS

| 37,771 | Perley | Feb. 24, 1863 |
| 676,838 | Dawson | June 19, 1901 |
| 2,302,280 | Warren | Nov. 17, 1942 |
| 2,598,001 | Kunz | May 27, 1952 |
| 2,609,730 | Bergstrom | Sept. 9, 1952 |

FOREIGN PATENTS

| 727,307 | Germany | Oct. 30, 1942 |